3,367,944
PROCESS FOR PREPARING 3-PHENYLPYRROLE-2-CARBOXYLIC ACID DERIVATIVES

Suminori Umio, Kawanishi, Kazuo Kariyone, Kyoto, Kunihiko Tanaka, Osaka, Teiji Kishimoto, Kyoto, and Hideyo Noguchi, Kobe, Japan, assignors to Fujisawa Pharmaceutical Co., Ltd., Osaka, Japan, a company of Japan
No Drawing. Filed Sept. 22, 1965, Ser. No. 489,412
Claims priority, application Japan, Mar. 22, 1965, 40/16,850, 40/16,851
4 Claims. (Cl. 260—326.3)

This invention relates to novel compounds and to processes for preparing the same. More particularly, this invention is concerned with 3-phenylpyrrole-2-carboxylic acid derivative of the general formula:

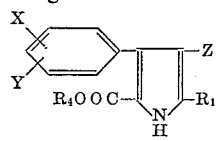

wherein X is hydrogen, halogen, nitro or lower alkoxy; Y is halogen, nitro or lower alkoxy; Z is hydrogen or halogen; $R_1$ is lower alkyl; and $R_4$ is hydrogen, lower alkyl or aralkyl.

It is an object of this invention to provide novel and useful compounds which are important as an unstriped muscle relaxant and also as key intermediates in the preparation of 3-phenylpyrrole derivatives, e.g. 3-(2-nitro-3-chlorophenyl)-4-chloropyrrole. 3-(2-nitro-3-chlorophenyl)-4-chloropyrrole is an antibiotic substance produced by the fermentation method using a pseudomonas strain and possesses high anti-microbial activities against fungi, particularly trichophyton and weak activities against gram-positive bacteria.

It is also an object to provide processes for preparing 3-phenylpyrrole-2-carboxylic acid derivatives mentioned above.

Other objects and advantageous features will become apparent as the description proceeds.

The object compound of this invention, 3-phenylpyrrole-2-carboxylic acid derivative may be prepared by reacting 1-phenylalkanone derivative having the general Formula I:

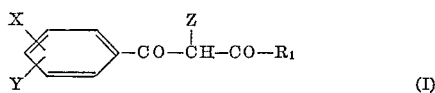

or its alkali metal salt, with glycine derivative having the general Formula II:

or its salt to make N-(3-phenyl-3-oxopropylidene) glycine derivative having the general Formula III:

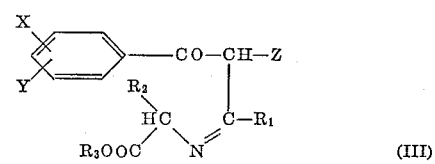

then by ring-closing the resultant (III) in the presence of a condensing agent, and if needed, by hydrolysing the reaction product.

In the above formula X represents hydrogen, halogen, nitro or lower alkoxy; Y represents halogen, nitro or lower alkoxy; Z represents hydrogen or halogen; $R_1$ represents lower alkyl; $R_2$ represents hydrogen or esterified carboxyl; —$COOR_3$ represents esterified carboxyl wherein $R_3$ is lower alkyl or aralkyl. As used herein, the term "lower" is intended to mean groups containing from one to six carbon atoms.

The mechanism for the reaction can be represented as follows:

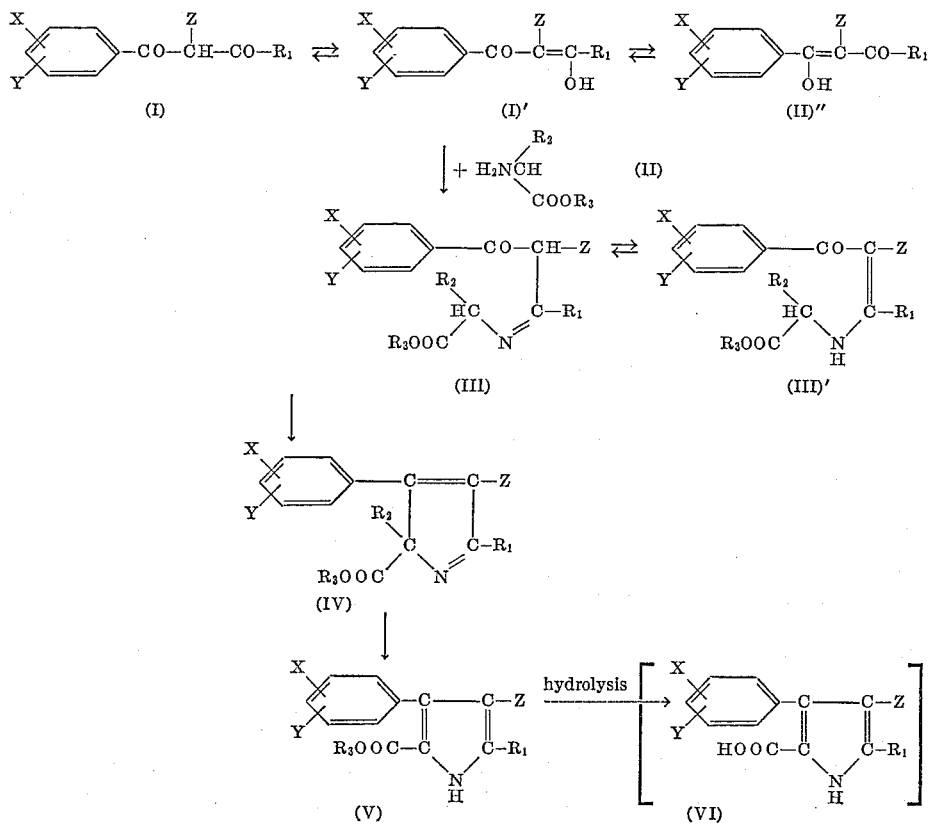

In the above formula, (I)′, (I)″, and (III)′ are represented for the tautomers of (I) and (III), respectively.

1-phenylalkanone derivatives as a starting material are partly known substances, e.g. 1-(2-nitro-4-chlorophenyl)-1,3-butanedione (Journal of Organic Chemistry 11, 414) and may be prepared by using the method of the said journal and/or the method known in the arts.

1-phenylalkanone derivatives (I) in this invention mean 1-phenyl-1,3-butanedione, 1-phenyl-2-halo-1,3-butanedione, 1-phenyl-1,3-pentanedione, 1-phenyl-2-halo-1,3-pentanedione, 1-phenyl-1,3-hexanedione, 1-phenyl-1-2-halo-1,3-hexanedione, etc., in each of which phenyl may be substituted with one or two of nitro, halogen such as chlorine or bromine, and lower alkoxy such as methoxy, ethoxy, propoxy or butoxy.

Also, glycine derivatives (II) include glycine esters such as the methyl ester, ethyl ester, propyl ester, butyl ester, tert.-butyl ester, benzyl ester or phenethyl ester, or aminomalonic acid diester such as the dimethyl ester, diethyl ester, dipropylester, dibutlyester, ditert.-butyl ester, dibenzyl ester, diphenethyl ester. As the salts of (II) are used the salts of (II) with inorganic acid as hydrochloric acid, sulfuric acid, etc., or with organic acid.

The reaction of 1-phenylalkanone derivative (I) or its alkali metal salt, with glycine derivative (II) or its salt is generally carried out in a solvent, and may be carried out with the addition of a base. Among the solvents are water, benzene, xylene, aliphatic lower alcohol, dichloromethane, chloroform, tetrachloromethane, 1,2-dichloroethane, glacial acetic acid, acetic acid, etc. A few examples of the bases are alkali metal hydroxide such as sodium hydroxide or potassium hydroxide, alkalimetal hydrogen carbonate such as sodium hydrogen carbonate or potassium hydrogen carbonate, alkalimetal carbonate such as sodium carbonate or potassium carbonate and organic base such as sodium acetate, piperidine, pyridine or trialkylamine. In using the salt of glycine derivative (II) as the starting material, it is preferable to carry out the reaction in the presence of the base. The reaction temperature is not particularly limited, being preferably at room temperature or at the boiling point of a solvent to be used.

By this reaction, N-(3-phenyl-3-oxopropylidene) glycine derivatives (III) produced can generally be separated out in crystals, but, in some cases, 3-phenylpyrrole-2-carboxylic acid derivatives (V) may be produced through (IV), as the result of the ring-closure of (III) which will take place subsequent to the said reaction. For instance, (V) can be obtained by reacting (I) with (II) in the presence of the condensing agent such as sodium hydroxide or ethyl polyphosphate under anhydrous condition.

The ring-closure of (III) is generally carried out in the presence of a condensing agent and in an absolute solvent. Among the condensing agents are alkalimetal (as potassium or sodium), alkalimetal alcoholate, alkalimetal hydride, alkalimetal amide, tripheylmethyl alkali metalate, boron tri-fluoride, zinc, chloride, aluminium chloride, aluminium bromide, ferric chloride, tinic chloride bismuth trichloride, titanium chloride, hydrogen chloride, hydrogen fluoride, a mixture of acetic anhydride and alkalimetal carbonate or alkalimetal acetate, pyrophosphoric acid, ethyl pyrophosphate, polyphosphoric acid, methyl polyphosphate, ethyl polyphosphate, propyl polyphosphate, isopropyl polyphosphate, piperidine, pyridine, triethylamine, and so forth.

The condensing agent in liquid may be used as a solvent. A few examples of the solvents are ethanol, ether, benzene, toluene, xylene, dioxane, tetrahydrofuran, dimethylsulfoxide or dimethyl formamide. The reaction is mainly carried out under cooling or heating to the boiling point of a solvent to be used.

Thus obtained 3-phenylpyrrole-2-carboxylic acid derivatives (V), by hydrolysis, may be converted to the corresponding free acid, if needed. A preferable hydrolyzing agent is alkali such as sodium hydroxide or potassium hydroxide, or inorganic acid such as sulfuric acid.

Furthermore, 3-phenylpyrrole-2-carboxylic acid derivative of this invention may also be prepared by the following procedure using 3-phenyl-5-alkylpyrrole derivatives which are the decarboxylated compound of 3-phenyl-5-alkylpyrrole-4-carboxylic acid derivatives prepared in our previously filed application No. 468,970. That is, the method is that 3-phenyl-5-alkylpyrrole derivative is reacted with carbonyldihalide as phosgene to obtain 3-phenyl-5-alkylpyrrole-2-carboxylic acid halide derivative and then solvolyzed it with water or alcohol.

Thus obtained object compounds of this invention can be converted to 3-phenylpyrrole derivatives having antimicrobial activities as follows: for instance, 3-(2-nitro-3-chlorophenyl)-4-chloropyrrole is obtained by chlorination of 3-(2-nitro-3-chlorophenyl)-5-methylpyrrole-2-carboxylic acid ester which is an object compound of this invention, solvolysis of the resultant 3-(2-nitro-3-chlorophenyl)-4-chloro-5-trichloromethylpyrrole-2-carboxylic acid ester and then decarboxylation of the so obtained 3-(2-nitro-chlorophenyl)-4-chloropyrrole-2,5-dicarboxylic acid.

The following examples illustrate the invention without, however, limiting the same thereto.

*Example 1*

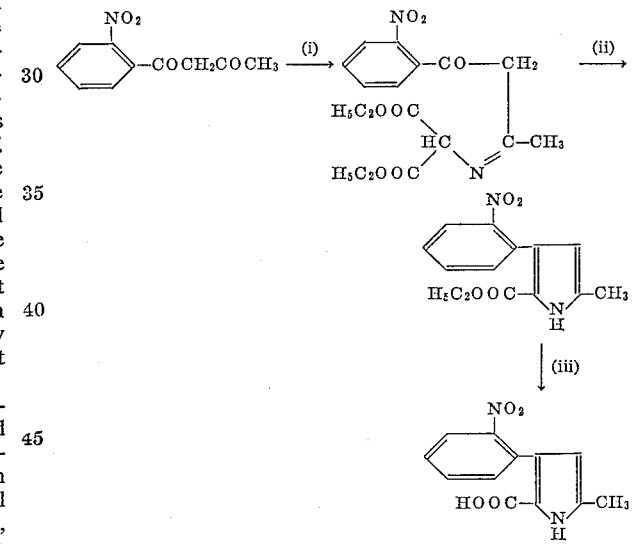

(i) A mixture of 4.0 g. of 1-(2-nitrophenyl)-1,3-butanedione, 4.5 g. of diethyl aminomalonate, 30 cc. of absolute ethyl alcohol and two drops of piperidine was refluxed for 5 hours. After completion of the reaction, ethyl alcohol was distilled off under reduced pressure. The residue was treated with ether and then the separated crystals were collected by filtration and then washed with ether and dried to obtain 4.3 g. of yellow crystals. The crystals were recrystallized from a mixed solvent of benzene and ether to obtain diethyl N-[1-methyl-3-(2-nitrophenyl)-3-oxopropylidene] aminomalonate as faint yellow granules having M.P. 85.5–87.5° C.

*Analysis.*—Calculated for $C_{17}H_{20}O_7N_2$: C, 56.04; H, 5.53; N, 7.69. Found: C, 56.01; H, 5.44; N, 7.75.

(ii) A solution of 0.5 g. of diethyl N-[1-methyl-3-(2-nitrophenyl)-3-oxopropylidene] aminomalonate in 2 cc. of absolute tetrahydrofuran was added dropwise with stirring to a solution of sodium ethoxide prepared from 6 cc. of absolute ethyl alcohol and 70 mg. of metallic sodium. After the reaction mixture was refluxed for 5 hours, the solvents were distilled off, under reduced pressure. The residue was added with water and the solution was extracted with ether. The ether extract was washed with water, dried over magnesium sulfate and then ether was distilled off to obtain an oily substance. This oily substance was treated with ether to obtain crystals. The crystals were recrystallized from 95% ethyl alcohol to obtain ethyl 3-(2-nitrophenyl)-5-methylpyrrole-2-carboxylate as yellow crystals having M.P. 161.5–163° C.

*Analysis.*—Calculated for $C_{14}H_{14}O_4N_2$: C, 61.31; H, 5.15; N, 10.21. Found: C, 61.60; H, 5.46; N, 10.26.

(iii) A mixture of 1.0 g. of ethyl 3-(2-nitrophenyl)-5-methylpyrrole-2-carboxylate, 30 cc. of 10% aqueous solution of sodium hydroxide and 10 cc. of ethanol was refluxed for 4 hours. After cooling, the reaction mixture was poured into 30 cc. of 10% sulfuric acid and diluted with 100 cc. of water. The solution was extracted with ethyl acetate, after which the extract was dried and condensed to obtain 600 mg. of 3-(2-nitrophenyl)-5-methylpyrrole-2-carboxylic acid.

*Example 2*

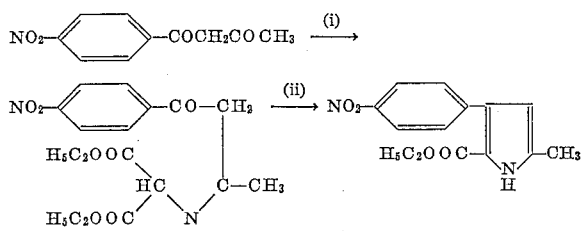

(i) A mixture of 30.0 g. of 1-(4-nitrophenyl)-1,3-butanedione, 30.5 g. of diethyl aminomalonate, 100 cc. of absolute benzene was refluxed for 10 hours. After completion of the reaction, benzene was distilled off under reduced pressure. The solid thus obtained was recrystallized from methanol to obtain 31.7 g. of diethyl N-[1-methyl-3-(4-nitrophenyl)-3-oxopropylidene] aminomalonate as yellow needles having M.P. 86–87° C.

*Analysis.*—Calculated for $C_{17}H_{20}O_7N_2$: C, 56.04; H, 5.53; N, 7.69. Found: C, 56.29; H, 5.74; N, 7.67.

(ii) A solution of 20.0 g. of diethyl N-[1-methyl-3-(4-nitrophenyl)-3-oxopropylidene] aminomalonate, 400 g. of ethyl polyphosphate and 800 cc. of absolute chloroform was refluxed for 18 hours. After completion of the reaction, chloroform was distilled off under reduced pressure. To the residue was added an ice-water to decompose ethyl polyphosphate and then the solution was extracted with ether. The extract was washed with aqueous sodium hydroxide, with water and then dried over anhydrous magnesium sulfate, after which ether was distilled off. The residue was submitted to silica-gel column chromatography with chloroform. The crystals obtained from the first fraction was recrystallized from ethanol to obtain 2.4 g. of ethyl 3-(4-nitrophenyl)-5-methylpyrrole-2-carboxylate as faint yellow scales having M.P. 189–191° C.

*Analysis.*—Calculated for $C_{14}H_{14}O_4N_2$: C, 61.30; H, 5.14; N, 10.22. Found: C, 61.36; H, 5.16; N, 10.27.

*Example 3*

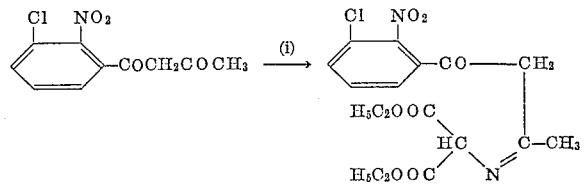

(i) A mixture of 2.0 g. of 1-(2-nitro-3-chlorophenyl)-1,3-butanedione, 1.9 g. of diethyl aminomalonate, 1.5 cc. of absolute ethyl alcohol and two drops of piperidine was refluxed for 5 hours. After cooling, the reaction mixture was allowed to stand and then crystals were separated. The crystals were collected by filtration and then dried to obtain 2.5 g. of colorless crystals. The crystals were recrystallized from a mixed solvent of benzene and ether to obtain diethyl N-[1-methyl-3-(2-nitro-3-chlorophenyl)-3-oxopropylidene] aminomalonate as colorless needles having M.P. 134–136° C.

Infra-red absorption spectrum:

$$\nu GO = 1740, 1605\ (Cm.^{-1})$$
$$\nu NO_2 = 1540, 1370\ (cm.^{-1})$$

(ii) A solution of 0.8 g. of diethyl N-[1-methyl-3-(2-nitro-3-chlorophenyl)-3-oxopropylidene] aminomalonate in 4 cc. of absolute tetrahydrofuran was added dropwise with stirring to a solution prepared with 8 cc. of absolute ethanol and 100 mg. of metallic sodium. After the reaction mixture was refluxed for 4.5 hours, the solvents were distilled off under reduced pressure. The residue was added with an ice-water and the solution was extracted with ether. The extract was washed with water, dried over anhydrous magnesium sulfate, after which ether was distilled off. The residue was recrystallized from benzene to obtain ethyl 3-(2-nitro-3-chlorophenyl)-5-methylpyrrole-2-carboxylate as colorless needles having M.P. 220–223° C.

(iii) A mixture of 200 mg. of ethyl 3-(2-nitro-3-chlorophenyl)-5-methylpyrrole-2-carboxylate, 5 cc. of 5% aqueous solution of sodium hydroxide and 5 cc. of ethanol was refluxed for 3.5 hours. After cooling, the reaction mixture was acidified with 10% sulfuric acid, added with water and the solution was extracted with ethyl acetate. The extract was dried, after which the solvent was distilled off. The product thus obtained was recrystallized from a mixed solvent of ethylacetate and ligroin to obtain 130 mg. of 3-(2-nitro-3-chlorophenyl)-5-methylpyrrole-2-carboxylic acid as colorless needles having M.P. 211° C. (dec.).

*Analysis.*—Calculated for $C_{12}H_9O_4N_2Cl$: C, 51.35; H, 3.23; N, 9.98. Found: C, 51.52; H, 3.41; N, 9.73.

*Example 4*

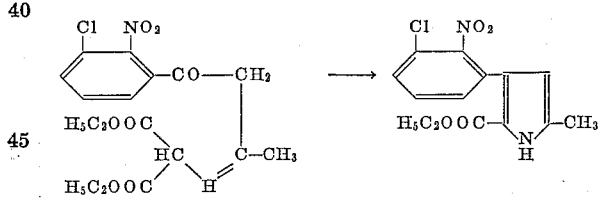

A mixture of 0.8 g. of diethyl N-[1-methyl-3-(2-nitro-3-chlorophenyl)-3-oxopropylidene] aminomalonate prepared in the same manner as described in the example 3–(i), 16.0 g. of ethyl polyphosphate and 20 cc. of chloroform was refluxed for 15 hours. After completion of the reaction, chloroform was distilled off under reduced pressure. To the residue was added an ice-water to decompose ethyl polyphosphate and then the solution was extracted with ether. The extract was washed with aqueous sodium hydroxide, with water and then dried over anhydrous magnesium sulfate, after which ether was distilled off. The residue was recrystallized from benzene to obtain 315 mg. of ethyl 3-(2-nitro-3-chlorophenyl)-5-methylpyrrole-2-carboxylate as colorless crystals having M.P. 222–223° C.

Example 5

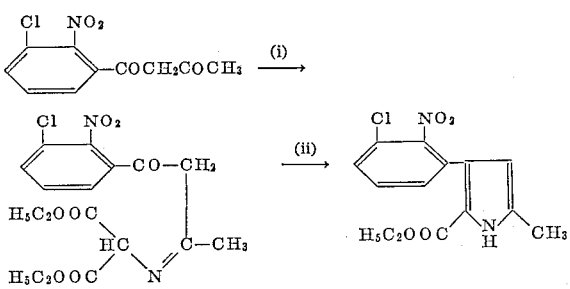

(i) A mixture of 2.0 g. of 1-(2-nitro-3-chlorophenyl)-1,3-butanedione, 1.8 g. of diethyl aminomalonate and 10 cc. of absolute benzene was refluxed for 10 hours in Dean-Stark's dehydrating apparatus. After completion of the reaction, benzene was distilled off under reduced pressure. The residue was treated with ether and then crystals were separated. The crystals were collected by filtration, and then washed with ether and dried, after which the crystals were recrystallized from a mixed solvent of benzene and ligroin to obtain 2.86 g. of diethyl N-[1-methyl-3-(2-nitro-3-chlorophenyl)-3-oxopropylidene] aminomalonate having M.P. 135–136° C.

*Analysis.*—Calculated for $C_{17}H_{19}O_7N_2Cl$: C, 51.20; H, 4.80; N, 7.02. Found: C, 51.24; H, 4.90; N, 7.07.

(ii) Diethyl N-[1-methyl-3-(2-nitro-3-chlorophenyl)-3-oxopropylidene] aminomalonate was treated in the same manner as described in the example 4 to obtain ethyl 3-(2-nitro-3-chlorophenyl)-5-methylpyrrole-2-carboxylate having M.P. 222–223° C.

Example 6

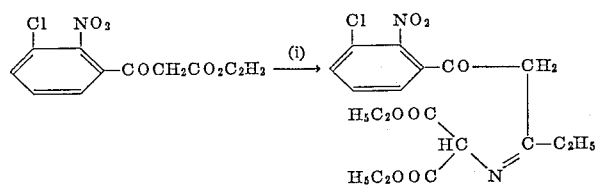

(i) A mixture of 4.5 g. of 1-(2-nitro-3-chlorophenyl)-1,3-pentanedione and 25 cc. of absolute benzene was refluxed for 10 hours in Dean-Stark's dehydrating apparatus, after which the benzene was distilled off under reduced pressure to obtain 9.0 g. of brown solids. The solids were recrystallized from a mixed solvent of benzene and petroleum benzene to obtain diethyl N-[1-ethyl-3-(2-nitro-3-chlorophenyl)-3-oxopropylidene] aminomalonate having M.P. 86–87° C.

*Analysis.*—Calculated for $C_{18}H_{21}O_7N_2Cl$: C, 52.37; H, 5.13; N, 6.79; Cl, 8.59. Found: C, 52.55; H, 5.31; N, 6.59; Cl 8.86.

(ii) A mixture of 7.4 g. of diethyl N-[1-ethyl-3-(2-nitro-3-chlorophenyl)-3-oxopropylidene] aminomalonate, 148 g. of ethyl polyphosphate and 148 cc. of absolute chloroform was refluxed for 16 hours. After completion of the reaction, chloroform was distilled off under reduced pressure. To the residue was added 200 cc. of ice-water to decompose ethyl polyphosphate and the solution was extracted with ether. The extract was washed three times with 5% aqueous sodium hydroxide, with water and then dried over anhydrous magnesium sulfate, after which ether was distilled off to obtain brown solids. The solids were recrystallized from methanol to obtain 2.3 g. of crude substance having M.P. 189–190° C., which was further recrystallized from methanol to obtain ethyl 3-(2-nitro-3-chlorophenyl)-5-ethylpyrrole-2-carboxylate having M.P. 191–192° C.

*Analysis.*—Calculated for $C_{15}H_{15}O_4N_2Cl$: C, 55.81; H, 4.68; N, 8.68; Cl, 10.99. Found: C, 55.56; H, 4.89; N, 8.68; Cl, 11.08.

(iii) A mixture of 1.0 g. of ethyl 3-(2-nitro-3-chlorophenyl)-5-ethylpyrrole-2-carboxylate, 10 cc. of 10% aqueous solution of sodium hydroxide and 10 cc. of ethanol was refluxed for 3 hours. After cooling, the reaction mixture was treated in the same manner in the Example 3–(iii). The product thus obtained was recrystallized from a mixed solvent of benzene and ethanol to obtain 550 mg. of 3-(2-nitro-3-chlorophenyl)-5-methylpyrrole-2-carboxylic acid as colorless needles having M.P. 182–183° C.

*Analysis.*—Calculated for $C_{13}H_{11}N_2O_4Cl$: C, 52.98; H, 3.76; N, 9.51. Found: C, 52.74; H, 3.75; N, 9.28.

Example 7

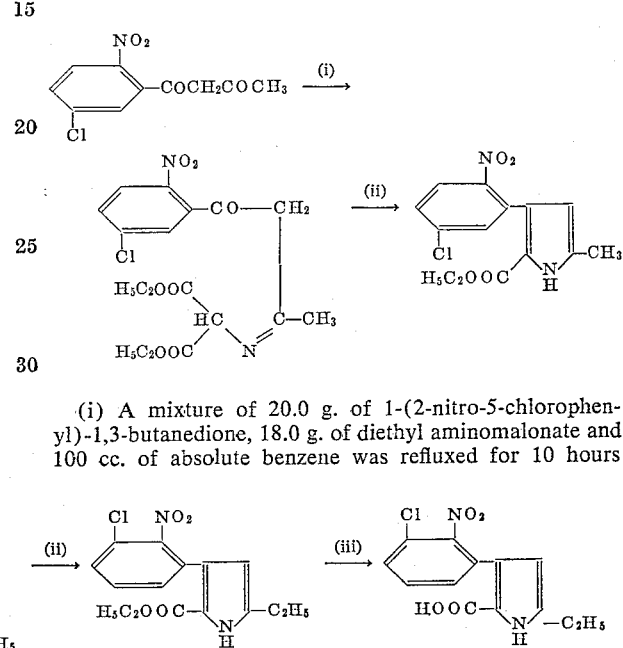

(i) A mixture of 20.0 g. of 1-(2-nitro-5-chlorophenyl)-1,3-butanedione, 18.0 g. of diethyl aminomalonate and 100 cc. of absolute benzene was refluxed for 10 hours in Dean-Stark's dehydrating apparatus. After completion of the reaction, the reaction mixture was washed four times with 30 cc. of aqueous sodium hydroxide, washed twice with water and then dried over anhydrous magnesium sulfate, after which the solvent was distilled off to obtain 32.5 g. of diethyl N-[1-methyl-3-(2-nitro-5-chlorophenyl)-3-oxopropylidene] aminomalonate as oily substance.

Infra-red absorption spectrum:

$\nu C{=}O$: 1760, 1743, 1610 (cm.$^{-1}$)
$\nu NO_2$: 1345 (cm.$^{-1}$).

(ii) A mixture of 17.8 g. of diethyl N-[1-methyl-3-(2-nitro-5-chlorophenyl)-3-oxopropylidene] aminomalonate, 17.8 g. of ethyl polyphosphate and 900 cc. of absolute chloroform was refluxed for 48 hours. After completion of the reaction, chloroform was distilled off. To the residue was added an ice-water to decompose ethyl polyphosphate and then the solution was extracted with ether. The extract was washed with aqueous sodium hydroxide, water and then dried, after which ether was distilled off. The residue was submitted to column chromatography and eluted with benzene. The crystals obtained from the first fraction were recrystallized from ethanol to obtain 6.1 g. of ethyl 3-(2-nitro-5-chlorophenyl)-5-methylpyrrole-2-carboxylate as pale yellow needles having M.P. 155–156° C.

*Analysis.*—Calculated for $C_{14}H_{13}N_2O_4Cl$: C, 54.47; H, 4.25; N, 9.08. Found: C, 54.36; H, 4.62; N, 9.30.

Example 8

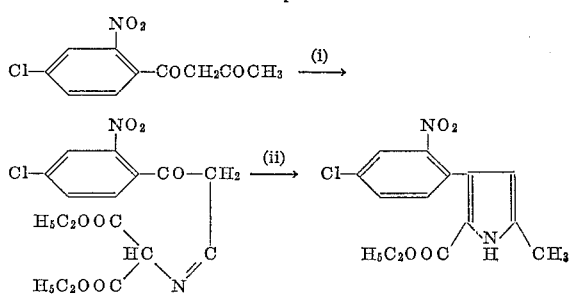

(i) 1 - (2 - nitro-4-chlorophenyl)-1,3-butanedione (1.2 g.), 1.1 g. of diethyl aminomalonate and 10 cc. of absolute benzene were treated in the same manner as described in the Example 7–(i), after which the product was recrystallized from a mixed solvent of benzene and ligroin to obtain 1.2 g. of diethyl N-[1-methyl-3-(2-nitro-4 - chlorophenyl)-3-oxopropylidene] aminomalonate as yellow needles having M.P. 110–111.5° C.

*Analysis.*—Calculated for $C_{17}H_{19}O_7N_2Cl$: C, 51.20; H, 4.80; N, 7.02. Found: C, 51.49; H, 4.85; N, 6.99.

(ii) A mixture of 0.7 g. of diethyl N-[1-methyl-3-(2-nitro - 4 - chlorophenyl) - 3-oxopropylidene] aminomalonate, 15.0 g. of ethyl polyphosphate and 40 cc. of chloroform was treated in the same manner as described in the Example 4 to obtain 100 mg. of ethyl 3-(2-nitro-4-chlorophenyl) - 5 - methylpyrrole-2-carboxylate having M.P. 156–157° C.

*Analysis.*—Calculated for $C_{14}H_{13}N_2O_4Cl$: C, 54.47; H, 4.24; N, 9.08. Found: C, 54.53; H, 4.28; N, 9.28.

Example 9

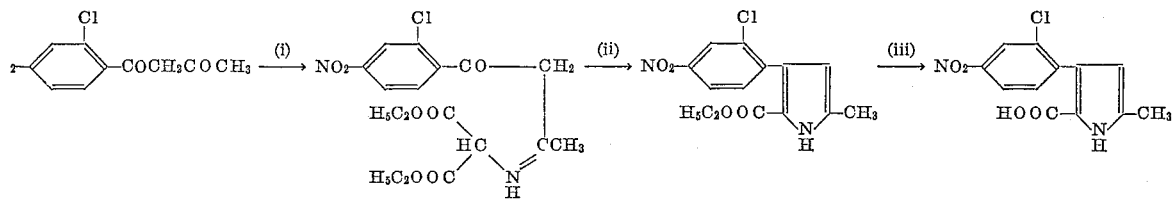

(i) A mixture of 20.0 g. of 1-(2-chloro-4-nitrophenyl)-1,3-butanedione, 18.0 g. of diethyl aminomalonate and 100 cc. of absolute benzene was treated in the same manner as described in the Example 7–(i), after which the product was recrystallized from 99% ethanol to obtain 29.5 g. of diethyl N-[1-methyl-3-(2-chloro-4-nitrophenyl)-3-oxopropylidene] aminomalonate as yellow crystals having M.P. 78–79° C.

*Analysis.*—Calculated for $C_{17}H_{19}O_7N_2Cl$: C, 51.20; H, 4.80; N, 7.02; Cl, 8.89. Found: C, 51.21; H, 4.98; N, 7.07; Cl, 9.12.

(ii) A mixture of 14.0 g. of diethyl N-[1-methyl-3-(2 - chloro - 4 - nitrophenyl)-3-oxopropylidene] aminomalonate, 280 g. of ethyl polyphosphate and 700 cc. of absolute chloroform was refluxed for 45 hours. After completion of the reaction, the reaction mixture was treated in the same manner as described in the Example 7–(ii) to obtain 5.2 g. of ethyl 3-(2-chloro-4-nitrophenyl)-5-methylpyrrole-2-carboxylate as crude crystals.

The crystals were recrystallized from ethanol to obtain ethyl 3-(2-chloro-4-nitrophenyl) - 5 - methylpyrrole-2-carboxylate having M.P. 202–203° C. (dec.).

*Analysis.*—Calculated for $C_{14}H_{13}O_4N_2Cl$: C, 54.47; H, 4.24; N, 9.07; Cl, 11.48. Found: C, 54.48; H, 4.49; N, 8.93; Cl, 11.42.

(iii) A mixture of 1.0 g. of ethyl 3-(2-chloro-4-nitrophenyl)-5-methyl-2-carboxylate, 30 cc. of 10% aqueous solution of sodium hydroxide and 10 cc. of ethanol was refluxed for 4 hours, after which the reaction mixture was treated in the same manner as described in the Example 3–(iii) to obtain 600 mg. of 3-(2-chloro-4-nitrophenyl) - 5 - methylpyrrole-2-carboxylic acid as crude substance having M.P. 226–227° C. (dec.).

This compound was decarboxylated and confirmed as a resulting 3-(2-chloro-4-nitrophenyl)-5-methylpyrrole having M.P. 165–167° C. Its elementary analysis was as follows.

*Analysis.*—Calculated for $C_{11}H_9O_2N_2Cl$: C, 55.83; H, 3.83; N, 11.84; Cl, 14.98. Found: C, 55.80; H, 3.99; N, 11.86; Cl, 14.90.

Example 10

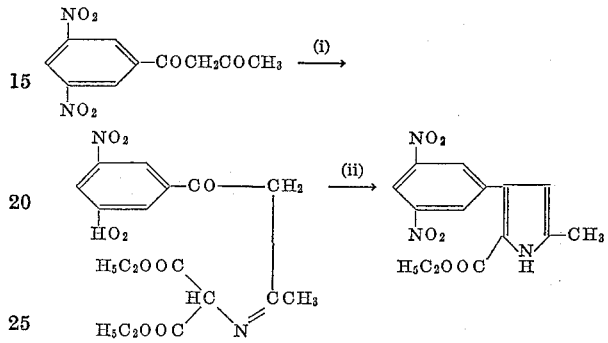

(i) A mixture of 8.0 g. of 1-(3,5-dinitrophenyl)-1,3-butanedione, 5.6 g. of diethyl aminomalonate and 50 cc. of absolute benzene was refluxed for 10 hours in the reaction vessel equipped with the dehydrating apparatus. After completion of the reaction, the reaction mixture was treated in the same manner as described in the Example 7–(i) to obtain 9.5 g. of crude product. The product was recrystallized from benzene to obtain diethyl N-[1-methyl - 3 - (3,5 - dinitrophenyl) - 3 - oxopropylidene] aminomalonate as yellow needles having M.P. 163.5–165.5° C.

*Analysis.*—Calculated for $C_{17}H_{19}O_9N_3$: C, 49.88; H, 4.68; N, 10.27. Found: C, 49.86; H, 4.96; N, 10.05.

(ii) A mixture of 8.0 g. of diethyl N-[1-methyl-3-(3,5 - dinitrophenyl)-3-oxopropylidene] aminomalonate, 120 g. of ethyl polyphosphate and 160 cc. of absolute chloroform was treated in the same manner as described in the Example 4, after which the product was recrystallized from acetone to obtain 1.8 g. of ethyl 3-(3,5-dinitrophenyl) - 5 - methylpyrrole-2-carboxylate as yellow crystals having M.P. 211–212° C.

*Analysis.*—Calculated for $C_{14}H_{13}O_6N_3$: C, 52.66; H, 4.10; N, 13.16. Found: C, 52.84; H, 4.35; N, 13.37.

Example 11

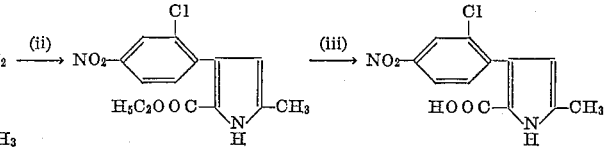

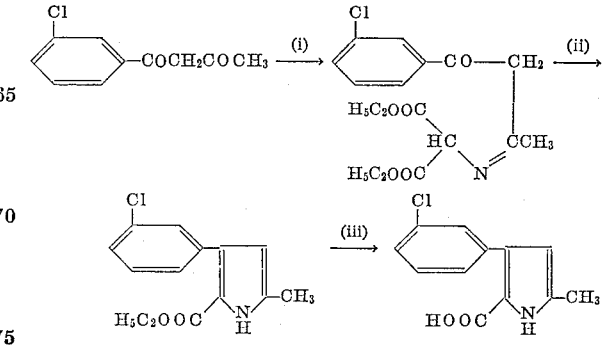

(i) A mixture of 20.0 g. of 1-(3-chlorophenyl)-1,3-butanedione, 18.0 g. of diethyl aminomalonate and 100 cc. of absolute benzene was treated in the same manner as described in the Example 7–(i), after which the product was recrystallized from a mixed solvent of ether and n-hexane to obtain diethyl N-[1-methyl-3-(3-chlorophenyl)-3-oxopropylidene] aminomalonate as colorless needles having M.P. 54–56° C.

*Analysis.*—Calculated for $C_{17}H_{20}O_5NCl$: C, 57.71; H, 5.69; N, 3.96. Found: C, 57.93; H, 5.72; N, 4.17.

(ii) A solution of 9.5 g. of diethyl N-[1-methyl-3-(3-chlorophenyl)-3-oxopropylidene] aminomalonate in 38 cc. of absolute tetrahydrofuran was added dropwise with stirring to a solution of sodium ethoxide prepared from 130 cc. of absolute ethanol and 1.33 g. of metallic sodium. Hereafter the reaction mixture was treated in the same manner as described in the Example 3–(ii) to obtain 4.25 g. of crude crystals. The crystals were recrystallized from a mixed solvent of benzene and n-hexane to obtain ethyl 3-(3-chlorophenyl)-5-methylpyrrole - 2 - carboxylate having M.P. 154–155° C.

*Analysis.*—Calculated for $C_{14}H_{14}O_2NCl$: C, 63.76; H, 5.36; N, 5.32. Found: C, 63.99; H, 5.50; N, 5.47.

(iii) A mixture of 4.0 g. of ethyl 3-(3-chlorophenyl)-5-methylpyrrole-2-carboxylate, 120 cc. of 10% aqueous solution of sodium hydroxide and 40 cc. of ethanol was refluxed for 4 hours, after which the reaction mixture was treated in the same manner as described in the Example 3–(iii) to obtain 2.1 g. of 3-(3-chlorophenyl)-5-methylpyrrole-2-carboxylic acid as crude substance having M.P. 140–141° C. (dec.).

This compound was decarboxylated and confirmed as 3-(3-chlorophenyl)-5-methylpyrrole of colorless scales having M.P. 60–61° C. Its elementary analysis was as follows.

*Analysis.*—Calculated for $C_{11}H_{10}NCl$: C, 68.93; H, 5.26; Cl, 18.50. Found: C, 68.83; H, 5.39; Cl, 18.20.

*Example 12*

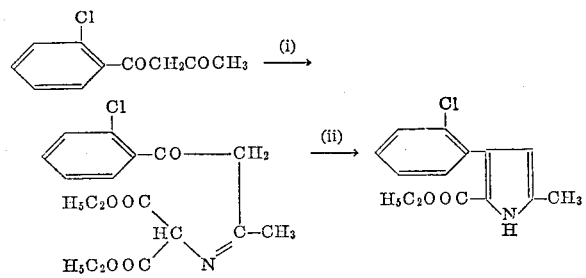

(i) A mixture of 20.0 g. of 1-(2-chlorophenyl)-1,3-butanedione, 21.4 g. of diethyl aminomalonate and 100 cc. of absolute benzene was treated in the same manner as described in the Example 7–(i) to obtain 38.0 g. of crude diethyl N - [1 - methyl-3-(2-chlorophenyl)-3-oxopropylidene] aminomalonate. This product was recrystallized from methanol to obtain diethyl N-[1-methyl-3-(2-chlorophenyl)-3-oxopropylidene] aminomalonate having M.P. 61–63° C.

*Analysis.*—Calculated for $C_{17}H_{20}O_5NCl$: C, 57.71; H. 5.70; N 3.96. Found: C, 57.69; H, 5.67; N, 3.97.

(ii) A mixture of 15.0 g. of diethyl N-[1-methyl-3-(2-chlorophenyl)-3-oxopropylidene] aminomalonate, 300 g. of ethyl polyphosphate and 600 cc. of absolute chloroform was refluxed for 18 hours. After completion of the reaction, the reaction mixture was treated in the same manner as described in the Example 7–(ii) to obtain 4.0 g. of ethyl 3 - (2 - chlorophenyl)-5-methylpyrrole-2-carboxylate having M.P. 141–142° C.

*Analysis.*—Calculated for $C_{14}H_{14}O_2NCl$: C, 63.76; H, 5.35; N, 5.31. Found: C, 63.56; H, 5.65; N, 5.43.

*Example 13*

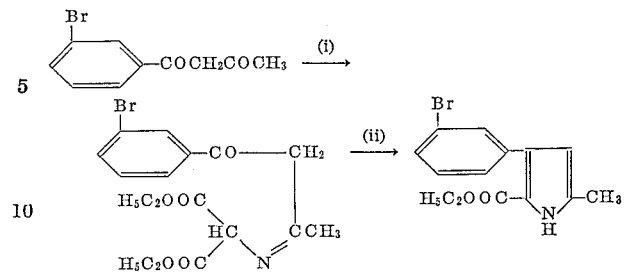

(i) A mixture of 17.2 g. of 1-(3-bromophenyl)-1,3-butanedione, 15.3 g. of diethyl aminomalonate and 70 cc. of absolute benzene was refluxed for 10 hours in Dean-Stark's dehydrating apparatus, after which the reaction mixture was treated in the same manner as described in the Example 7–(i). The product thus obtained was recrystallized from a mixed solvent of benzene and petroleum ether to obtain 2.0 g. of diethyl N-[1-methyl-3-(3-bromophenyl)-3-oxopropylidene] aminomalonate as faint yellow needles having M.P. 54–55° C.

*Analysis.*—Calculated for $C_{17}H_{20}O_5NBr$: C, 51.26; H, 5.03; N, 3.52. Found: C, 51.17; H, 5.23; N, 3.63.

(ii) A solution of 7.4 g. of diethyl N-[1-methyl-3-(3-bromophenyl)-3-oxopropylidene] aminomalonate in 30 cc. of absolute ethanol was added to a solution of sodium ethoxide prepared from 90 cc. of absolute ethanol and 1.0 g. of metallic sodium. The mixture was refluxed for 5 hours, after which the solvent was distilled off under reduced pressure. The residue was added with an ice-water and then crystals were separated. The crystals were collected by filtration and dried, after which the crystals were dissolved into benzene and the solution was filtered to remove impurities. The filtrate was condensed under reduced pressure to obtain crude crystals, which were recrystallized from ethanol to obtain 1.6 g. of ethyl 3-(3-bromophenyl)-5-methylpyrrole-2-carboxylate as colorless plates having M.P. 160–161° C.

*Analysis.*—Calculated for $C_{14}H_{14}O_2NBr$: C, 54.56; H, 4.58; N, 4.55. Found: C, 54.27; H, 4.56; N, 5.07.

*Example 14*

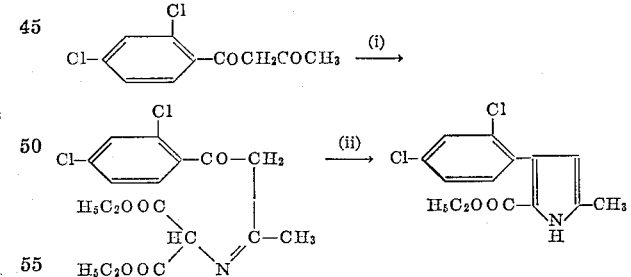

(i) A mixture of 7.0 g. of 1-(2,4-dichlorophenyl)-1,3-butanedione, 6.0 g. of diethyl aminomalonate and 35 cc. of absolute benzene was refluxed for 10 hours, after which the reaction mixture was treated in the same manner as described in the Example 5–(i). The product thus obtained was recrystallized from a mixed solvent of benzene and petroleum benzene to obtain 5.0 g. of diethyl N-[1-methyl-3 - (2,4 - dichlorophenyl) - 3-oxopropylidene]-3 aminomalonate as oily substance.

(ii) A solution of 4.0 g. of diethyl N-[1-methyl-3-(2,4-dichlorophenyl)-3-oxopropylidene]aminomalonate in 15 cc. of absolute ethanol was added to a solution of sodium ethoxide prepared from 52 cc. of absolute ethanol and 0.52 g. of metallic sodium. The mixture was refluxed for 5 hours, after which the reaction mixture was treated in the same manner as described in the Example 3–(ii). The product thus obtained was developed over thin layer chromatography of silica gel with benzene. Then the second fraction which fluoresced under radiation of ultraviolet rays was collected and extracted with chloroform, after which chloroform was distilled off under reduced pressure.

The residue was recrystallized from ethanol to obtain 0.4 g. of ethyl 3-(2,4-dichlorophenyl)-5-methylpyrrole-2-carboxylate as colorless scales having M.P. 193° C.

*Analysis.*—Calculated for $C_{14}H_{13}O_2NCl_2$: C, 56.39; H, 4.40; N, 4.70; Cl, 23.78. Found: C, 56.35; H, 4.45; N, 4.61; Cl, 23.57.

*Example 15*

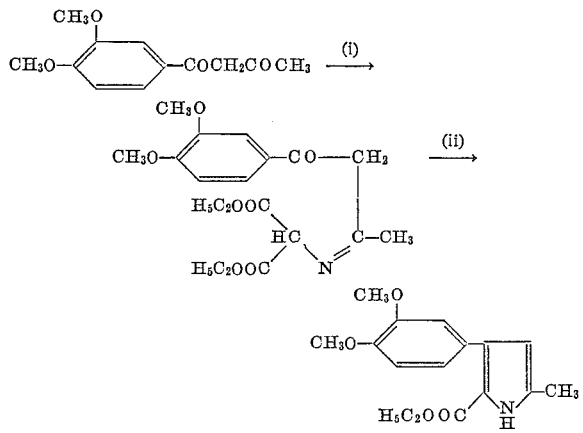

(i) A mixture of 23.0 g. of 1-(3,4-dimethoxyphenyl)-1,3-butanedione, 21.8 g. of diethyl aminomalonate and 350 cc. of absolute benzene was refluxed for about 10 hours in Dean-Stark's dehydrating apparatus. After completion of the reaction, benzene was distilled off to obtain yellow oily substance, which was cooled and then crystallized. The crystals thus obtained were recrystallized from aqueous ethanol to obtain 21.0 g. of diethyl N - [1 - methyl - 3-(3,4-dimethoxyphenyl)-3-oxopropylidene] aminomalonate having M.P 101–102° C.

*Analysis.*—Calculated for $C_{19}H_{25}NO_7$: C, 60.15; H, 6.64; N, 3.69. Found: C, 59.88; H, 6.82; N, 3.84.

(ii) A mixture of 21.0 g. of diethyl N-[1-methyl-3-(3,4-dimethoxyphenyl)-3-oxopropylidene] aminomalonate, 400 g. of ethyl polyphosphate and 800 cc. of absolute chloroform was refluxed for about 15 hours under reduced pressure. After completion of the reaction, chloroform was distilled off. To the residue was added an ice-water to decompose ethyl polyphosphate and then the solution was extracted with chloroform. The extract was washed with 5% aqueous sodium hydroxide, with water and then dried over anhydrous magnesium sulfate, after which chloroform distilled off to obtain 11.0 g. of the residue. The residue was treated as described in the Example 7–(ii) to obtain crude product, which was recrystallized from 95% ethanol to obtain ethyl 3-(3,4-dimethoxyphenyl)-5-methylpyrrole-2-carboxylate having M.P. 122–123° C.

*Analysis.*—Calculated for $C_{16}H_{19}NO_4$: C, 66.42; H, 6.42; N, 4.84. Found: C, 66.12; H, 6.60; N, 4.87.

*Example 16*

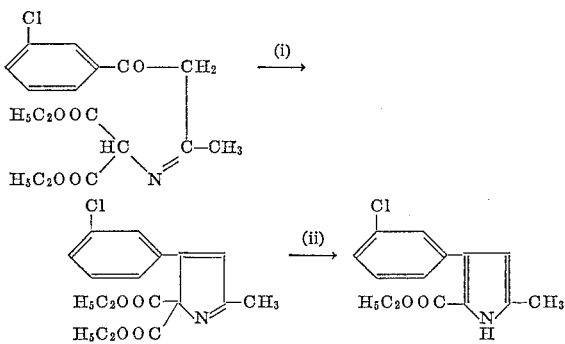

(i) A mixture of 1.0 g. of diethyl N-[1-methyl-3-(3-chlorophenyl)-3-oxapropylidene] aminomalonate obtained in the Example 11–(i), 20.0 g. of ethyl polyphosphate and 20 cc. of absolute chloroform was refluxed for 17 hours. After completion of the reaction, chloroform was distilled off under reduced pressure. To the residue was added an ice-water to decompose ethyl polyphosphate and then the solution was extracted with ether. The extract was washed with aqueous sodium hydroxide, water and then dried over anhydrous magnesium sulfate, after which ether was distilled off to obtain 0.7 g. of crude product. The product was recrystallized from a mixed solvent of ether and n-hexane to obtain diethyl 3-(3-chlorophenyl)-5-methyl-2H-pyrrole-2,2-dicarboxylate as colorless crystals having M.P. 79–80° C.

*Analysis.*—Calculated for $C_{17}H_{18}O_4NCl$: C, 60.80; H, 5.41; N, 4.17; Cl, 10.56. Found: C, 61.20; H, 5.50; N, 4.22; Cl, 10.70.

(ii) A solution of 500 mg. of diethyl 3-(3-chlorophenyl)-5-methyl-2H-pyrrole-2,2-dicarboxylate in 3 cc. of absolute tetrahydrofuran was added dropwise to a solution of sodium ethoxide prepared from 40 mg. of metallic sodium and 5 cc. of absolute ethanol and then the mixture was refluxed for 3 hours. After completion of the reaction, the solvents were distilled off under reduced pressure. The residue was added with ice-water and the solution was extracted with ether to obtain 400 mg. of crude crystals. The crystals were recrystallized from a mixed solvent of benzene and n-hexane to obtain ethyl 3-(3-chlorophenyl)-5-methylpyrrole-2-carboxylate as colorless scales having M.P. 154–155° C.

*Example 17*

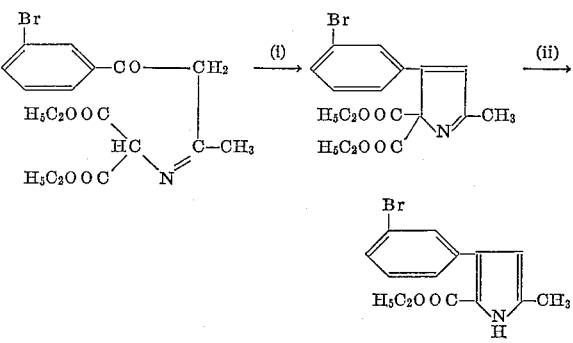

(i) A mixture of 2.0 g. of diethyl N-[1-methyl-3-(3-bromophenyl) - 3 - oxopropylidene] aminomalonate obtained in the Example 13–(i), 40.0 g. of ethyl polyphosphate and 40 cc. of absolute chloroform was refluxed for 15 hours, after which the reaction mixture was treated in the same manner as described in the Example 16–(i). The product thus obtained was recrystallized from a mixed solvent of ether and n-hexane to obtain 1.1 g. of diethyl 3 - (3-bromophenyl)-5-methyl-2H-pyrrole-2,2-dicarboxylate as colorless needles having M.P. 77.5–78° C.

*Analysis.*—Calculated for $C_{17}H_{18}O_4NBr$: C, 53.70; H, 4.77; N, 3.68. Found: C, 53.69; H, 4.85; N, 3.50.

(ii) A solution of 100 mg. of diethyl 3-(3-bromophenyl)-5-methyl-2H-pyrrole-2,2-dicarboxylate in 2 cc. of absolute ethanol was added dropwise to a solution of sodium ethoxide prepared from 9 mg. of metallic sodium and 3 cc. of absolute ethanol and then the mixture was refluxed for 3 hours. After cooling, the solvent was distilled off under reduced pressure to obtain solids. To this solids, an ice-water was added, and then insoluble substance was collected by filtration and washed with water. This substance was recrystallized from 95% ethanol to obtain 650 mg. of ethyl 3-(3-bromophenyl)-5-methylpyrrole-2-carboxylate as colorless plates having M.P. 160–161° C.

15

Example 18

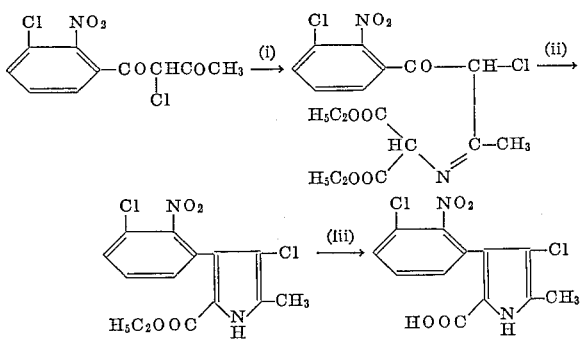

(i) A mixture of 2.0 g. of 1-(2-nitro-3-chlorophenyl)-2-chloro-1,3-butanedione,[1] 1.5 g. of diethyl aminomalonate and 20 cc. of absolute benzene was refluxed for 10 hours. After completion of the reaction, the solvent was distilled off under reduced pressure. The residue was added with ether and then crystals were separated. The crystals were collected by filtration, and then recrystallized from a mixed solvent of benzene and petroleum benzene to obtain 2.3 g. of diethyl N-[1-methyl-2-chloro-3-(2-nitro-3-chlorophenyl)-3-oxopropylidene] aminomalonate having M.P. 107–108.5° C.

*Analysis.*—Calculated for $C_{17}H_{18}O_7N_2Cl_2$: C, 47.13; H, 4.19; N, 6.47; Cl, 16.37. Found: C, 47.00; H, 4.31; N, 6.20; Cl, 16.23.

(ii) A mixture of 1.0 g. of diethyl N-[1-methyl-2-chloro-3-(2-nitro-3-chlorophenyl)-3-oxopropylidene] aminomalonate, 15.0 g. of ethyl polyphosphate and 20 cc. of chloroform was refluxed for 19 hours. After completion of the reaction, the reaction mixture was treated in the same manner as described in the Example 4. The product thus obtained was recrystallized from benzene to obtain 205 mg. of ethyl 3-(2-nitro-3-chlorophenyl)-4-chloro-5-methylpyrrole-2-carboxylate, M.P. 248.5–249.5° C.

*Analysis.*—Calculated for $C_{14}H_{12}O_4N_2Cl_2$: C, 48.99; H, 3.53; N, 8.16; Cl, 20.66. Found: C, 49.16; H, 3.68; N, 8.31; Cl, 20.52.

(iii) A mixture of 500 mg. of ethyl 3-(2-nitro-3-chlorophenyl)-4-chloro-5-methylpyrrole-2-carboxylate, 15 cc. of 10% aqueous sodium hydroxide solution and 5 cc. of ethanol was refluxed for 4 hours, after which the reaction mixture was treated in the same manner as described in the Example 3–(iii) to obtain 400 mg. of 3-(2-nitro-3-chlorophenyl)-4-chloro-5-methylpyrrole-2-carboxylic acid as crude substance having M.P. 248–249° C. (dec.). This compound was decarboxylated and confirmed as a resulting 3-(2-nitro-3-chlorophenyl)-5-methylpyrrole as yellow prisms having M.P. 82–84° C. Its elementary analysis was as follows.

*Analysis.*—Calculated for $C_{11}H_9O_2N_2Cl$: C, 55.83; H, 3.84; N, 11.84. Found: C, 55.89; H, 4.16; N, 12.01.

Example 19

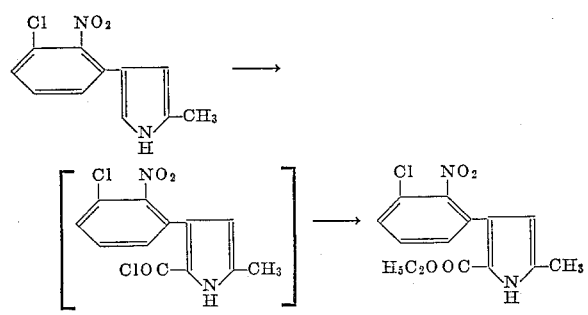

---
[1] 1-(2-nitro-3-chlorophenyl)-2-chloro-1,3-butanedione was prepared from 1-(2-nitro-3-chlorophenyl)-1,3-butanedione and sulfuryl chloride. Melting point: 76–78° C.
*Analysis.*—Calculated for $C_{10}H_7O_3NCl_2$: C, 43.50; H, 2.56; N, 5.08; Cl, 25.68. Found: C, 43.80; H, 2.52; N, 5.25; Cl, 25.42.

16

3-(2-nitro-3-chlorophenyl)-5-methylpyrrole (476 mg.) and 242 mg. of dimethylaniline were dissolved into 20 cc. of absolute benzene. Excess phosgene was passed into the above mixture with stirring, after which the mixture was refluxed for 1.5 hours to obtain a solution of 3-(2-nitro-3-chlorophenyl)-5-methylpyrrole-2-carbonyl chloride.

To this solution of 3-(2-nitro-3-chlorophenyl)-5-methylpyrrole-2-carbonyl chloride thus obtained, 242 mg. of dimethylaniline and about 1 g. of absolute ethanol were added and the mixture was allowed to stand for 30 minutes. Then, dried air was passed through the reaction mixture to remove phosgene, after which benzene was distilled off under reduced pressure. The residue was added with 1% hydrochloric acid and the solution was extracted with ethyl acetate. The extract was washed with 1% hydrochloric acid, with water, dried over anhydrous magnesium sulfate and decolorized, after which the solvent was distilled off and then needle-like crystals were separated. The crystals were washed with a little amount of cooled benzene and then recrystallized from benzene to obtain 360 mg. of ethyl 3-(2-nitro-3-chlorophenyl)-5-methylpyrrole-2-carboxylate having M.P. 222–223° C.

*Analysis.*—Calculated for $C_{14}H_{13}O_4N_2Cl$: C, 54.46; H, 4.24; N, 9.08. Found: C, 54.61; H, 4.37; N, 9.07.

Example 20

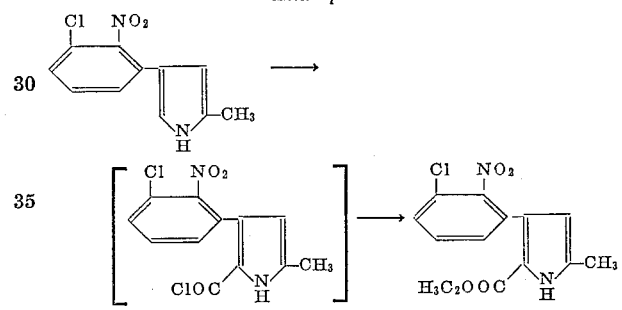

3-(2-nitro-3-chlorophenyl)-5-methylpyrrole (2.0 g.) and 1.0 g. of dimethylaniline were dissolved into 25 cc. of absolute benzene. To this solution, a solution of 3.8 g. of phosgene in 30 cc. of absolute benzene was added dropwise with stirring, after which the mixture was refluxed for an hour. To the cooled reaction mixture, a mixed solution of 17 cc. of absolute methanol and 1.0 g. of dimethylaniline was added dropwise, after which the mixture was stirred at room temperature for an hour. The reaction mixture was passed into with dried air to remove excess phosgene away and then allowed to stand overnight. The separated crystals were collected by filtration. On the other hand the filtrate was washed with 5% aqueous solution of sodium hydroxide, dried and condensed, and then crystals were separated. These crystals were put together and recrystallized from benzene to obtain 2.0 g. of methyl 3-(2-nitro-3-chlorophenyl)-5-methylpyrrole-2-carboxylate as colorless needles having M.P. 198–199° C.

*Analysis.*—Calculated for $C_{13}H_{11}O_4N_2Cl$: C, 52.98; H, 3.76; N, 9.51; Cl, 12.03. Found: C, 52.78; H, 3.88; N, 9.36; Cl, 12.18.

Example 21

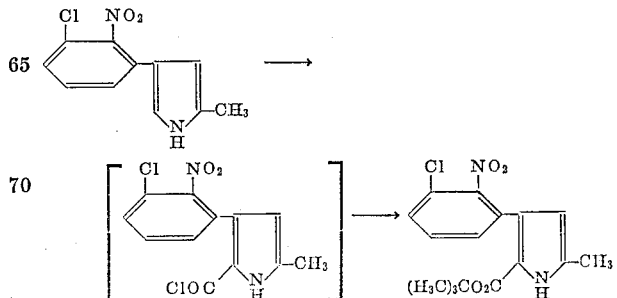

3-(2-nitro-3-chlorophenyl) - 5 - methylpyrrole (4.8 g.) and 2.4 g. of dimethylaniline were dissolved into 200 cc. of benzene, and then the mixture was treated in the same manner as described in the Example 19. The solution of 3-(2-nitro-3-chlorophenyl) - 5 - methylpyrrole-2-carbonyl chloride thus obtained was treated with 2.4 g. of dimethylaniline and 15 g. of tert.-butanol in the same manner as described in the Example 19. The solution of 3-(2-nitro-3-chlorophenyl)-5-methylpyrrole-2-carbonylchloride was treated with 2.4 g. of dimethylaniline and 15 g. of t-butanol as described in the Example 19.

The product was recrystallized from benzene to obtain t-butyl 3-(2-nitro-3-chlorophenyl)-5-methylpyrrole-2-carboxylate as colorless needles having M.P. 224–225° C.

*Analysis.*—Calculated for $C_{16}H_{17}O_4N_2Cl$: C, 57.06; H, 5.09; N, 8.32; Cl, 10.53. Found: C, 56.98; H, 5.16; N, 8.32; Cl, 10.62.

*Example 22*

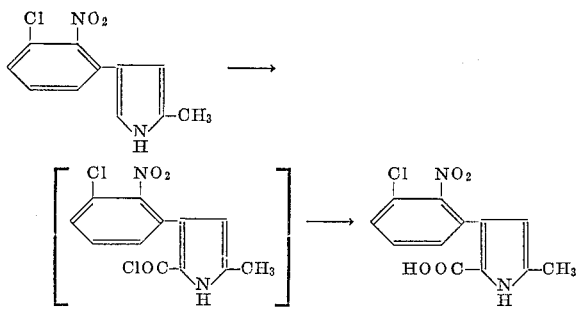

3-(2-nitro-3-chlorophenyl)-5-methylpyrrole (476 mg.) and 242 mg. of dimethylaniline were reacted with phosgene in the same manner as described in the Example 19. To the solution of 3-(2-nitro-3-chlorophenyl)-5-methylpyrrole-2-carbonyl chloride thus obtained, 20 cc. of an aqueous solution of 5% potassium carbonate was added dropwise under cooling with stirring. The mixture was strried for an hour under cooling and then water layer was separated. The water layer was acidified with 10% sulfuric acid under cooling and then extracted with ethyl acetate. The extract was washed with water, dried over anhydrous magnesium sulfate and decolorized, after which the solvent was distilled off under reduced pressure. The residue was recrystallized from a mixed solvent of ethyl acetate and ligroin to obtain 300 mg. of 3-(2-nitro-3-chlorophenyl)-5-methylpyrrole - 2 - carboxylic acid as colorless needles having M.P. 211° C. (dec.).

*Analysis.*—Calculated for $C_{12}H_9O_4N_2Cl$: C, 51.35; H, 3.23; N, 9.98. Found: C, 51.57; H, 3.39; N, 9.64.

*Example 23*

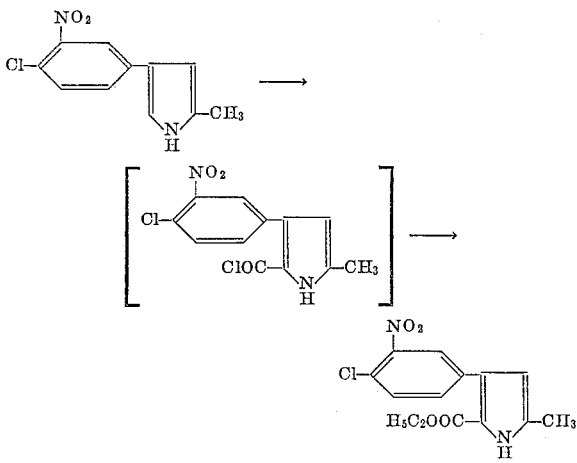

3-(3-nitro-4-chlorophenyl)-5-methylpyrrole (476 mg.) and 242 mg. of dimethylaniline were reacted with phosgene in the same manner as described in the Example 19. The solution of 3-(3-nitro-4-chlorophenyl) - 5 - methyl- pyrrole-2-carbonyl chloride thus obtained was treated with 242 mg. of dimethylaniline and 1 g. of ethanol in the same manner as described in the Example 19 to obtain 300 mg. of ethyl 3-(3-nitro-4-chlorophenyl) - 5 - methylpyrrole-2-carboxylate having M.P. 167° C.

*Analysis.*—Calculated for $C_{14}H_{13}O_4N_2Cl$: C, 54.46; H, 4.24; N, 9.08. Found: C, 54.58; H, 4.36; N, 8.99.

We claim:
1. A process for preparing a compound having the formula:

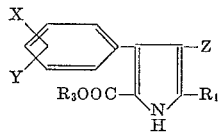

which comprises reacting 1-phenylalkanone derivative having the formula:

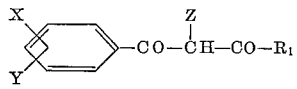

or its alkali metal salt, with glycine derivative having the formula:

$$NH_2-CH-COOR_3$$
$$\phantom{NH_2-}R_2$$

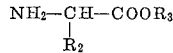

or its salt to obtain N-(3-phenyl-3-oxopropylidene) glycine derivative having the formula:

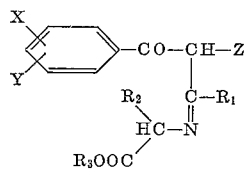

and then ring-closing said resultant compound in the presence of a condensing agent,
 wherein X is hydrogen, halogen, nitro or lower alkoxy; Y is halogen, nitro or lower alkoxy; Z is hydrogen or halogen; $R_1$ is lower alkyl; $R_2$ is hydrogen, or esterified carboxyl; —$COOR_3$ is esterified carboxyl.

2. A process of claim 1 in which the condensing agent is alkalimetal alcoholate, loweralkyl polyphosphate or the mixture of acetic acid and alkali metal acetate.

3. A process of claim 1 in which the reaction of said 1-phenylalkanone derivative with said glycine derivative is carried out in the presence of alkalimetal hydroxide or loweralkyl polyphosphate under anhydrous condition without the separation of N-(3-phenyl-3-oxopropylidene) glycine derivative.

4. A process of claim 1 additionally comprising hydrolyzing the resultant compound with an alkali metal hydroxide or sulfuric acid to obtain a compound having the general formula:

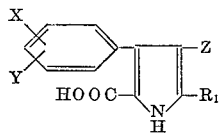

wherein X, Y, Z and $R_1$ are the same as described in claim 1.

References Cited

Corwin, "The Chemistry of Pyrrole and its Derivatives," from Heterocyclic Compounds, Elderfield (ed.), p. 287 (1950).

NICHOLAS S. RIZZO, *Primary Examiner.*

J. A. NARCAVAGE, *Assistant Examiner.*

UNITED STATES PATENT OFFICE
CERTIFICATE OF CORRECTION

Patent No. 3,367,944                                          February 6, 1968

Suminori Umio et al.

It is hereby certified that error appears in the above numbered patent requiring correction and that the said Letters Patent should read as corrected below.

Column 3, line 57, "tripheylmethyl" should read -- triphenylmethyl --; lines 59 and 60, "chloride bismuth" should read -- chloride, bismuth --. Column 6, line 3, in the first equation, "GO" should read -- CO --; same column 6, Example 4, the left-hand structure reading

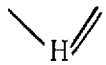  should read  

Column 9, Example 9, that portion of the structure reading

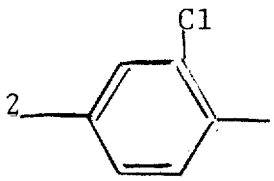  should read  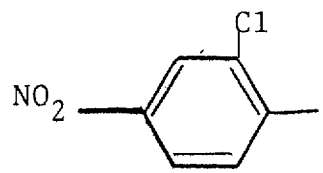

Column 10, Example 10, that portion of the structure reading

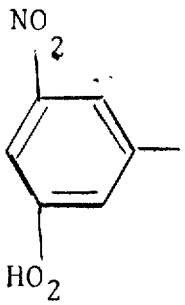  should read  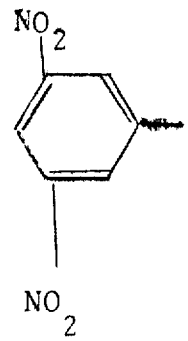

Column 14, line 2, "oxapropylidene" should read -- oxopropylidene --. Column 15, line 24, "petroleum benzene" should read -- petroleum benzine --. Column 16, Example 20, that portion of the stucture reading

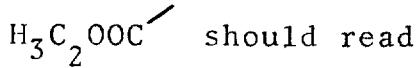  should read  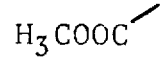

Signed and sealed this 26th day of August 1969.

(SEAL)
Attest:

EDWARD M. FLETCHER, JR.                      WILLIAM E. SCHUYLER, JR.
Attesting Officer                                   Commissioner of Patents